United States Patent [19]
Van Esdonk et al.

[11] 3,989,871
[45] Nov. 2, 1976

[54] METHOD OF MANUFACTURING A GAS DISCHARGE PANEL AND GAS DISCHARGE PANEL MANUFACTURE ACCORDING TO SAID METHOD

[75] Inventors: Johannes Van Esdonk; Johannes Petrus Hornman, both of Eindhoven, Netherlands

[73] Assignee: U.S. Philips Corporation, New York, N.Y.

[22] Filed: Aug. 29, 1974

[21] Appl. No.: 501,478

[30] Foreign Application Priority Data

Aug. 29, 1973 Netherlands .......................... 7311860

[52] U.S. Cl. .................................. 428/336; 29/194; 29/197; 428/457

[51] Int. Cl.² ............................................ B23P 3/00

[58] Field of Search .................... 117/227, 201, 217; 427/64–73; 428/336, 457; 29/197, 194

[56] References Cited

UNITED STATES PATENTS

| | | | |
|---|---|---|---|
| 3,713,876 | 1/1973 | Lavric | 117/227 |
| 3,748,178 | 7/1973 | Chen et al. | 117/227 |
| 3,854,957 | 12/1974 | Larry | 117/227 |

*Primary Examiner*—Bernard D. Pianalto
*Attorney, Agent, or Firm*—Frank R. Trifari; Carl P. Steinhauser

[57] ABSTRACT

Before assembling a gas discharge panel the active surfaces of the chromium-containing electrodes which constitute the cathodes are covered with a layer of sufficient thickness of platinum, aluminum or nickel which can prevent the formation of chromium oxide.

4 Claims, 2 Drawing Figures

METHOD OF MANUFACTURING A GAS DISCHARGE PANEL AND GAS DISCHARGE PANEL MANUFACTURE ACCORDING TO SAID METHOD

The invention relates to a method of manufacturing a gas discharge panel, in particular a display panel, at least consisting of an insulating base plate and an insulating transparent top plate, said plates having electrodes consisting of a chromium alloy, which electrodes constitute the cathodes and anodes for the gas discharges and which plates are secured together while being heated, for example, by means of a sealing glass which is melted.

It has been found that the electrodes during melting the sealing glass upon assembling the panel are covered with a chromium oxide layer. Such a chromium oxide layer is favourable indeed for the good adhesion of the electrodes to the glass of the plates, but the presence thereof of the cathodes infuences the operating voltage and the ignition voltage of the gas discharges.

Cleaning of the active cathode surfaces after sealing or securing the electrodes to the plates which usually consist of glass, provides little improvement since during heating for melting the sealing glass upon assembling the panel, a fresh chromium oxide layer is formed. Moreover, such a cleaning is cumbersome and hence expensive.

According to the invention the said drawback is considerably reduced in that at least the parts of the cathodes operative for the gas discharge are covered prior to assembling the panel with a metal layer whose thickness is sufficient to prevent the formation of chromium oxide during heating the plates upon assembling the panel, and which metal oxidizes less rapidly than chromium or the oxide of which sputters more rapidly in a gas discharge than chromium oxide.

The layer may consist of platinum with a thickness of 0.04 $\mu$ (400 A). Such a thin platinum layer proves already to be sufficiently dense to prevent the formation of chromium oxide and can be sputtered in a few hours during the trial period of the panel.

Preferably, however, a nickel layer or aluminum layer with a thickness of 1 to 20 $\mu$ is used. This layer is sufficiently dense to avoid the formation of chromium oxide. During assembly of the panel the nickel layer or aluminum layer oxidizes superficially but nickel oxide and aluminum oxide sputters much more rapidly than chromium oxide. The remaining nickel or aluminum of the layer need not be removed since this does not present any difficulties for the gas discharge.

Figure 1:
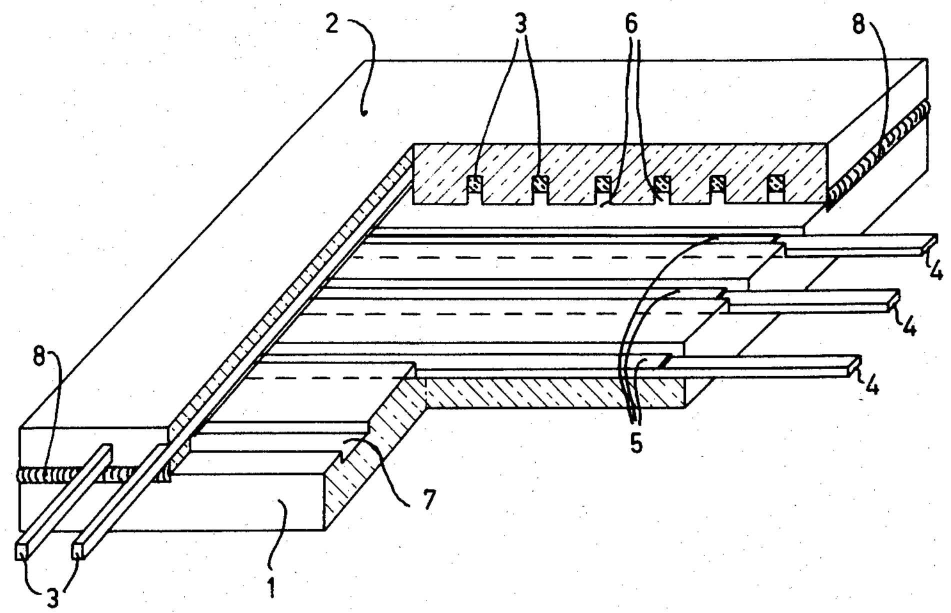
Figure 2:
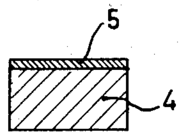

The invention will be described in greater detail with reference to the drawing, of which FIG. 1 is a perspective sectional view of a gas discharge panel, while FIG. 2 is a sectional view on an enlarged scale of a cathode of the panel shown in FIG. 1.

Reference numeral 1 in the drawing denotes a base plate, 2 is a top plate consisting of a transparent insulating material, in particlar glass.

Sealed in the top plate 2 are rod-shaped conductors 3 which are partly etched away so that channels 6 are formed. The same is the case with the conductors 4 which serve as the cathodes and are sealed in the base plate 1 which consists of glass. The conductors 3, 4 consist of an alloy composition of 47.5 weight percent Ni, 47.5 weight percent Fe and 5 weight percent Cr. Since the channels 6 of the base plate and top plate cross each other at right angles, cavities of which the height is equal to the sum of the depths of two channels 6 are formed at the crossings. In said cavities gas discharges may occur by applying suitable potential differences between the crossing anodes 3 and cathodes 4.

Finally the plates 1 and 2 are secured together by means of a readily melting type of glass 8 generally denoted by "sealing glass".

It has been found that the chromium of the active surfaces of the conductors 3 and 4 oxidizes during sealing said conductors in the plates 1 and 2 and heating the panel for melting the sealing glass 8, as a result of which a trial test of approximately 30 hours has to be carried out after filling the cavities with a suitable gas so as to sputter the chromium oxide from the active parts of the cathodes 4 and to obtain a constant ignition and operating voltage.

According to the invention this is avoided by covering the active surfaces of the cathodes 4, prior to assembly of the panel, with a layer 5 of a material which oxidizes less rapidly than chromium, or of which oxide, possibly formed during the melting of the sealing glass, sputters more rapidly than chromium oxide. The layer 5 must be sufficiently dense to prevent the formation of chromium oxide. However, such a layer 6 should not be provided on the cathode surfaces which constitute the vacuum-tight leadthrough of the cathode conductors to the exterior, since a chromium oxide layer promotes the adhesion to the sealing glass.

A suitable metal is platinum which forms a sufficiently dense layer already with a thickness of 0.04 $\mu$ to prevent the formation of chromium oxide. After a trial test of a few hours, the thin platinum layer, after assembly of the panel, may be sputtered. Due to the small quantity of platinum no difficulties occur as a result of condensation hereof on the walls of the channels 6.

An even more suitable metal for the layer 5 is nickel. Although nickel oxidizes superficially upon melting the sealing glass 8, said nickel oxide sputters much more rapidly than chromium oxide. However, the nickel layer should have a minimum thickness of 1 to 2 $\mu$ so as to be sufficiently dense, but this is no drawback since nickel does not exert a detrimental influence on the gas discharge since it itself is a suitable electrode material. So the layer itself need not be sputtered entirely and may therefore be chosen to be much thicker, for example 20 $\mu$ thick. Only the thin surface layer of nickel oxide should be removed from the active cathode surfaces.

Aluminum is also suitable for a layer thickness of 1 to 20 $\mu$. Although said metal also oxidizes during heating the panel upon assembly, said $Al_2O_3$ layer may be sputtered rapidly, while the remaining aluminum layer constitutes a suitable cathode surface.

Although several metals are useful, for example, gold and silver, the said metals are less suitable than platinum, nickel or aluminum since they have not only to be provided in thicker layers than aluminum but moreover they have to be sputtered entirely because they influence the gas discharge. Detrimental deposits may occur on the insulating surfaces between the conductors so that leakage current can occur and the top plate can become opaque.

What is claimed is:

1. In the method of manufacturing a gas discharge display panel comprising an insulating base plate and an insulating transparent top plate, said plates supporting electrodes consisting of a chromium alloy, which electrodes constitute the cathodes and anodes for the gas discharges and which plates are assembled, while being heated to form a panel, the improvement comprising covering at least the parts of the cathodes operative for the gas discharge prior to assembling the panel with a layer of a metal selected from the group consisting of nickel, platinum and aluminum, said metal layer having a thickness sufficient to prevent the formation of chromium oxide during heating of the plates upon assembly of the panel.

2. A method as claimed in claim 1, wherein at least the active electrode parts are covered with an aluminum layer with a thickness of 1 to 20 $\mu$.

3. A method as claimed in claim 1, wherein at least the active electrode parts are covered with a layer consistng of platinum with a thickness of 0.04 $\mu$.

4. A method as claimed in claim 1, wherein at least the active electrode parts are covered with a layer consisting of nickel with a thickness of 1 to 20 $\mu$.

* * * * *